(12) United States Patent
Chappell

(10) Patent No.: US 7,961,719 B2
(45) Date of Patent: Jun. 14, 2011

(54) END OF LINE MONITOR USING DOCSIS

(75) Inventor: Daniel K. Chappell, Greenwood, IN (US)

(73) Assignee: Acterna LLC, Germantown, MD (US)

( * ) Notice: Subject to any disclaimer, the term of this patent is extended or adjusted under 35 U.S.C. 154(b) by 1110 days.

(21) Appl. No.: 11/464,628

(22) Filed: Aug. 15, 2006

(65) Prior Publication Data

US 2007/0133425 A1 Jun. 14, 2007

Related U.S. Application Data

(60) Provisional application No. 60/748,046, filed on Dec. 7, 2005.

(51) Int. Cl.
*H04L 12/66* (2006.01)
*H04L 12/28* (2006.01)
*H04B 1/38* (2006.01)

(52) U.S. Cl. .................. 370/352; 370/402; 375/222

(58) Field of Classification Search ............... 370/402, 370/351; 725/151, 139
See application file for complete search history.

(56) References Cited

U.S. PATENT DOCUMENTS

| 6,344,749 | B1 * | 2/2002 | Williams ............... 324/620 |
| 6,393,478 | B1 | 5/2002 | Bahlmann |
| 6,711,135 | B1 | 3/2004 | Dziekan et al. |
| 6,785,292 | B1 | 8/2004 | Vogel |
| 6,802,032 | B1 | 10/2004 | Budinger et al. |
| 7,100,194 | B1 * | 8/2006 | Unger ............... 725/151 |
| 7,373,650 | B1 * | 5/2008 | Rodriguez et al. ...... 725/41 |
| 2002/0095685 | A1 | 7/2002 | Baldus et al. |
| 2002/0101630 | A1 | 8/2002 | Nikolich |
| 2002/0136165 | A1 * | 9/2002 | Ady et al. ............... 370/241 |
| 2004/0019876 | A1 | 1/2004 | Dravida et al. |
| 2004/0037217 | A1 | 2/2004 | Danzig et al. |
| 2004/0073664 | A1 | 4/2004 | Bestermann |
| 2004/0103442 | A1 * | 5/2004 | Eng ............... 725/126 |
| 2005/0047442 | A1 | 3/2005 | Volpe et al. |
| 2005/0286486 | A1 * | 12/2005 | Miller ............... 370/351 |
| 2007/0002875 | A1 * | 1/2007 | Rocci et al. ............... 370/401 |
| 2008/0031143 | A1 * | 2/2008 | Ostrosky ............... 370/242 |

FOREIGN PATENT DOCUMENTS

| WO | WO 01/86878 | 11/2001 |
| WO | WO 02/061979 | 8/2002 |

OTHER PUBLICATIONS

SCTE 23-1 2005, DOCSIS 1.1 Part 1: Radio Frequency Interface, Ch 3, pp. 11-21; Ch 9, Sections 9.1-9.3, pp. 173-194.
SCTE 23-2 2002 DOCSIS 1.1 Part 2: Baseline Privacy Plus Interface, Ch 5, pp. 9-14.
SCTE 23-3 2005 DOCSIS 1.1 Part 3: Operations Support System Interface, Ch 2, pp. 2-8.

* cited by examiner

*Primary Examiner* — Melanie Jagannathan
(74) *Attorney, Agent, or Firm* — Matthew A. Pequignot; Pequignot + Myers LLC

(57) ABSTRACT

The invention relates to a system for end-of-line monitoring of HFC networks by using a main tuner dedicated to receiving measurement requests from a network monitoring server via a DOCSIS downstream channel, and an auxiliary tuner used for the purpose of performing measurements of the downstream channel by analogue and digital measurement circuits. A cable modem is used to transmit measurement results to the server over a DOCSIS upstream channel. The addition of the auxiliary tuner, permits faster measurements to be performed by the EOL monitoring system and reported back to the server, thereby affording real-time remote testing and diagnostics.

10 Claims, 3 Drawing Sheets

END OF LINE MONITOR USING DOCSIS

CROSS-REFERENCE TO RELATED APPLICATIONS

This application claims priority from U.S. Provisional Patent Application No. 60/748,046 filed on Dec. 7, 2005, which is incorporated herein by reference.

TECHNICAL FIELD

The present invention relates to a system for end-of-line monitoring, and in particular to the monitoring of HFC networks using DOCSIS.

BACKGROUND TO THE INVENTION

Two-way hybrid fiber-coaxial (HFC) networks are shared bi-directional networks with point-to-multipoint transmission in the downstream direction, and multipoint-to-point transmission in the upstream direction. Signals are distributed via a fiber optic connection from a head-end to a node that converts the optical signal to an electrical signal, and then distributes the signals to residences via a tree and branch coaxial cable distribution network. At the subscriber side, terminal equipment supports the delivery of cable services (video, data and voice services) to subscribers, via cable modems. Data and voice services are supported by cable modems and communication gateways, respectively, which require the use of an upstream signal path. The network uses a fiber optic upstream signal path from the node to the head-end. A return band is used to support transmissions from devices at subscribers' premises back to the head-end. In such networks, many cable modems may compete for communication bandwidth in both the upstream and downstream directions.

A cable modem generally uses standardized communication protocol based on the Data over Cable System Interface Specification (DOCSIS) to access data services through the cable network, by using the downstream path to indicate exactly when each modem is permitted to transmit in the upstream direction.

The DOCSIS utilizes two primary data transmission elements; (a) Cable Modem Termination System (CMTS) located in specified nodes on the HFC network for distributing data to end-of-line subscribers, and (b) a Cable Modem (CM) residing at subscriber's premise. Subscribers send data from their digital devices (PC, VoIP phone, Video IP device, etc) into the cable modem, which then relays the data to the CMTS, which in turn relays the information to the appropriate network element. Information destined to the subscriber digital device is provided from the network to the CMTS, which in turn relays the information to the CM. The CM in turn relays the information to the subscriber's digital device. Additional network elements may be placed inside the cable network to support service delivery or to monitor service quality. All system maintenance, operation and network communications are outlined in the DOCSIS specification.

The DOCSIS requires that the downstream communication path be properly functioning for any upstream communication to happen. In cases where the signal to noise ratio (SNR) is too low in the downstream path for the cable modem to receive data, the downstream path may be unusable while the upstream path may function correctly. In such cases, a service call may require a service technician to be dispatched to a subscriber's location, considerable cost and loss of time.

It is, therefore, advantageous to implement an overall network management system that can quickly and cost-effectively locate various network faults and monitor network performance to allow for optimum delivery of various services to subscribers.

Several attempts as outlined below have so far been made to provide solutions for remote end-of-line monitoring and automatically measuring and the signal quality of downstream communications and transmitting the measurements upstream without being dependent on the downstream channel to be fully functional.

U.S. Patent application No. 2004/0103442 by Eng discloses a system for end-of-line monitoring of a node with a network such as a DOCSIS network. The system of Eng comprises a CMTS including a status monitoring Media Access Control (MAC), a network manager coupled to the CMTS, and status monitoring cable modems at termination points. The status monitoring cable modems include a measuring device capable of detecting and measuring downstream communication signals in the DOCSIS network and a transmitter for transmitting status information over the network to the status monitoring MAC at the CMTS. The measuring device is capable of measuring signal to noise ratio, power level, or other performance measurements. The status monitoring cable modem collects the status information from the measuring device and the transmitter transmits status packages over the network to the status monitoring MAC utilizing a special service channel. The status packages are transmitted at random intervals or only when a problem exists. The status monitoring MAC receives and decodes the status packages and relays the status information to the network manager. The network manager processes the status information and provides diagnostic, alerting, and other information to service personnel. Hence, Eng implements status monitoring and signal measuring capabilities into standard cable modems that are capable of utilizing the existing DOCSIS network for transmitting status information to the head-end equipment for evaluation. In this approach, however, the cable modem not being a stand-alone device would need to be powered from a source other than the communication trunk, which may impose certain practical limitations. Furthermore, in order to implement such a system, standard cable modems would have to be replaced at all termination points with cable modems incorporating the components for performing the status monitoring as disclosed above, which would incur a considerable additional system cost.

We also note that U.S. Patent application No.2004/0073664 by Bestermann and U.S. Pat. No. 6,393,478 issued to Bahlmann disclose alternative systems in which a cable modem is utilized to transmit status information to another device for analysis over the network. In Bestermann's system, the cable modem includes server software 20 that communicates with client software 24 through the CMTS 8 at the head-end. The server software 20 delivers measurement data stored in buffer 16 of the cable modem 6. This communication is performed using the IP protocol. This method of data communication is used to provide the data to a remote device rather than requiring a portable diagnostic device 12 to be coupled to port 14 to receive performance data as they are provided to port 14. Bestermann's system enables the network operator to avoid sending technicians for diagnostic visits and the proprietary implementation of such portable devices. Again, these two systems would require the cable modems to be modified to incorporate the software for communicating with the remote diagnostic device, involving a considerable additional cost.

U.S. Patent application No 2005/0047442 A1 by Volpe et al. describes an apparatus for quantifying and measuring communication signals in a HFC DOCSIS network. However, this apparatus does not take advantage of the DOCSIS standard for communicating the measurements or status information are over the DOCSIS network.

U.S. Pat. No. 6,802,032 issued to Budinger et al., U.S. Pat. No. 6,785,292 issued to Vogel, and U.S. Pat. No. 6,711,135 issued to Dziekan et al. and U.S. Patent application No. 2004/0037217 by Danzig et al. describe various systems for monitoring and performing diagnostics of communication signals in a CMTS or DOCSIS network. Again the systems disclosed in these references would require devices which are not stand-alone, thereby would need to be powered from a source other than the communication trunk, which may impose certain practical limitations.

In view of the limitations in the prior art reviewed above, there still remains a clear need for a stand-alone network monitoring apparatus, that is capable of being operated at any point in the HFC network and powered directly from the communication trunk, and without necessitating a replacement or modification of any of the existing network equipment.

An object of the present invention is to provide an economical stand-alone network monitoring apparatus to be powered directly from the communication trunk, that is capable of being operated at any point in the HFC and communicating over the DOCSIS standard while concurrently making uninterrupted real-time measurements of the HFC network performance in terms of physical layer parameters. A further object of the present invention is to provide a stand-alone network monitoring system that is capable of recording performance over a period of time to find intermittent problems that plague some cable systems.

SUMMARY OF THE INVENTION

Accordingly, the present invention relates to an end-of-line monitor for real time monitoring the performance of a Hybrid Fiber Coaxial (HFC) network based on Data-Over-Cable Service Interface Specification (DOCSIS), in response to a measurement request received from a remote server via an Internet Protocol, the monitor comprising::
a) a first tuner for receiving the measurement request, via a predetermined downstream channel of the hybrid network;
b) measuring means, in communication with the first tuner, for performing the requested measurement; and
c) a DOCSIS cable modem linked to the measuring means, for transmitting results of the requested measurement to the remote server, over a predetermined upstream channel of the hybrid network;
wherein, in operation, the server collects and evaluates the measurement results for performing remote end-of-line diagnostics.

In one embodiment, the measuring means comprises:
i) a second tuner selectively tunable to the at least one specified downstream channel; and
ii) a measuring circuit linked to the second tuner, the measuring circuit comprising an analogue measuring circuit, a digital measuring circuit, a multi-media terminal adapter, and an upstream sweep;
wherein:
the analogue measuring circuit is for performing the requested measurement of any parameter selected from the group consisting of analog signal levels, carrier level, carrier to noise ratio, and power line hum modulation, the digital measuring circuit is for performing the requested measurement of any parameter selected from the group consisting of modulation error ratio, bit error rate, and digital signal level, the multi-media terminal adapter is for performing the requested measurement of any parameter relevant to Voice over Internet Protocol, selected from the group consisting of frequency of lost packets, jitter and voice quality and upstream sweep is for performing the requested measurement of the upstream frequency response.

Optionally, the measuring means further comprises means for scheduling automatic measurement of a predefined set of channel parameters according to a preset schedule. Alternatively, the measurement request specifies at least one downstream channel to be tested and the measuring means comprises a second tuner selectively tunable to the at least one specified downstream channel to be tested, and a measuring circuit linked to the second tuner.

Preferably, the end-of-line monitor is operable at any selected subscriber node served by a trunk in the hybrid network and has a power supply fed by the trunk.

As the DOCSIS protocol has typically a long initialization time span (up to several minutes) to register, synchronize, etc., it is advantageous to have two tuners operating in parallel to reduce the test latency, whereby the main tuner is dedicated for maintaining connection to the DOCSIS service, and the auxiliary tuner being free for performing requested tests. The addition of the auxiliary tuner, permits faster measurements to be performed by the EOL monitoring system and reported back to the server, thereby affording real-time remote testing and diagnostics. A technician could sit at his desk and view over a web browser several EOL monitors as each performs the tests requested thereof.

BRIEF DESCRIPTION OF THE DRAWINGS

The invention will be described in greater detail with reference to the accompanying drawings which represent exemplary embodiments thereof, in which same reference numerals designate similar parts throughout the figures thereof, wherein.

DETAILED DESCRIPTION

Reference herein to any embodiment means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The present invention addresses the limitations of prior art systems by providing a system for end-of-line monitoring of HFC networks by using two tuners, one of which is dedicated to DOCSIS communication to substantially reduce the test latency.

Figure 1:
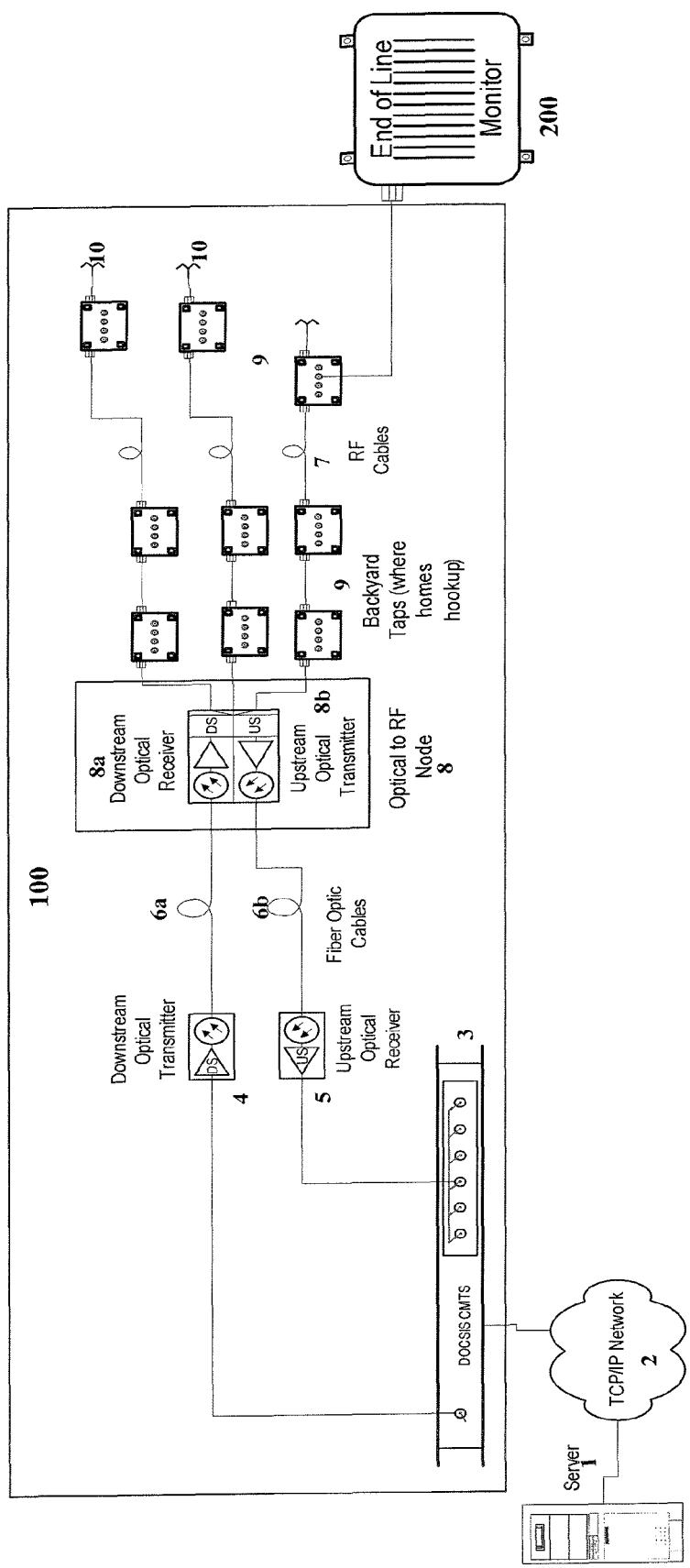
FIG. 1 illustrates the positioning within an HFC network, of an EOL monitor in accordance with an embodiment of the present invention.

FIG. 1 shows a Hybrid Fiber Coax (HFC) network 100, wherein an EOL monitor 200 in accordance with an embodiment of the present invention is positioned. HFC networks are commonly implemented to deliver to a home or business Cable Television (CATV) signals, including analog TV signals, digital TV signals, data and control signals. The HFC network 100 shown in FIG. 1 has a transceiver 3, commonly referred to as a Cable Modem Termination System or (CMTS). The transceiver 3 launches an RF-modulated downstream signal onto a downstream optical transmitter 4, which converts RF signals into optical signals to be fed into a downstream fiber optic link 6a. The fiber optic link 6a makes it possible to remotely locate a cable modem (CM), not shown, in a customer premises. The downstream signal carries control packets and payload packets for the cable modems. The downstream fiber optic link 6a, in turn, transmits the CMTS downstream signal to a neighborhood fiber node 8, housing a downstream optical receiver 8a, which converts the optical signals back to RF signals and distributes, via RF cables 7, the RF-modulated downstream signals to a number of RF taps 9 in tandem where homes and business hook up. Each RF tap 9 siphons off a small amount of the RF signal energy to be delivered to customer equipment via a cable modem (not shown). Each RF cable 7 ends with an end of line (EOL), which is terminated by a terminator 10 to maintain good signal transmission quality.

In turn, each cable modem receives customer response signals from customer equipment and transmits such response signals to the network as upstream signals using shared DOCSIS upstream frequency channels. The upstream signals are converted from RF to optical signals by an upstream optical transmitter 8b housed within the fiber node 8. The resulting optical upstream signals are delivered to the CMTS location by a fiber optic cable 6b, after being converted back to RF upstream signals by the upstream fiber receiver 5. These signals are then routed in the CMTS 3, thereby completing the communication circuit.

Any unused tap 9 at an EOL in the HFC network 100 will be a suitable point for plugging in the EOL monitor 200 for the purpose of monitoring the network 100. The EOL monitor 200 uses the transceiver 3 to communicate with a network monitoring server 1 via a TCP/IP network 2, using Internet Protocol. The server 1 schedules and instructs remote devices for performing real time measurements and then collects, evaluates and stores measurement results received from the remote devices, to remotely perform automated end-of-line diagnostics.

The cable modems commonly use standardized communication signaling protocol based on the Data over Cable System Interface Specification (DOCSIS) to access data services through the cable network, by using the downstream path to indicate exactly when each modem is permitted to transmit in the upstream direction. Full details of the DOCSIS are given in the following three ANSI standards documents, the contents of which are incorporated herein by reference.

SCTE 23-1 2005, DOCSIS 1.1 Part 1: Radio Frequency Interface;
SCTE 23-2 2002 (formerly DSS 02-10), DOCSIS 1.1 Part 2: Baseline Privacy Plus Interface Specification; and
SCTE 23-3 2005, DOCSIS 1.1 Part 3: Operations Support System Interface.

Figure 2:
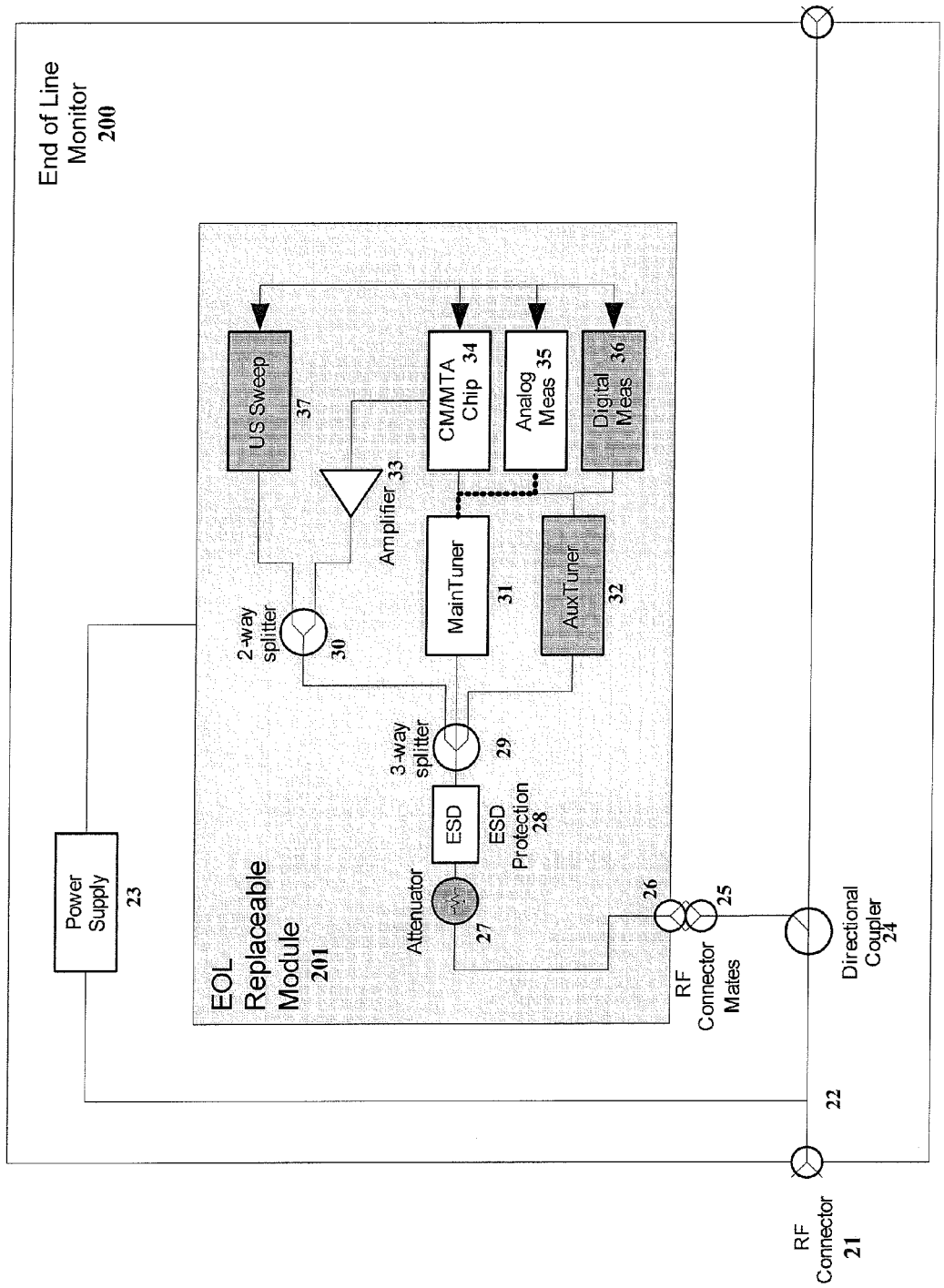
FIG. 2 illustrates in a Block Diagram the elements of the EOL monitor shown in FIG. 1.

FIG. 2 illustrates in a Block Diagram elements of the EOL monitor 200 in accordance with an embodiment of the present invention. As shown in this figure, the EOL monitor 200 has a number of elements, including:

A first RF connector 21 feeding a power tap 22 and a directional coupler 24;
a power supply 23 coupled to the power tap 22;
a second RF connector 25 coupled to the directional coupler 24; and
a replaceable EOL module 201, powered by the power supply 23 and coupled to the second RF connector 25 via a third RF connector 26 mating with the second RF connector 25.

The first RF connector 21 provides signal access to the RF cable 7 (shown in FIG. 1) as well as for drawing AC power from the same cable. The power tap 22 routes the AC power from the first RF connector 21 up to the power supply 23, which in turn provides regulated voltage to the EOL module 201 for consistent performance. The directional coupler 24 provides an RF signal to various communication and measurement circuits within the EOL module 201. The pair of mating second and third RF connectors 25 and 26 is provided inside and outside the EOL module 201 respectively to allow for removal of the EOL module 201 for possible replacements and future upgrades with minimum downtime. For the same purpose, the EOL module 201 is connected to the power supply 23 through a plug-in arrangement (not shown).

The EOL module 201 further includes an attenuator 27 coupled to an ESD protector 28, which in turn is coupled to a three-way splitter/combiner 29 branching into first, second and third paths. The first path leads to a two-way splitter/combiner 30 coupled to an upstream sweep 37 on one side and an output end of an amplifier 33 on the other side. The second path leads to a main (first) tuner 31 coupled to a CM chip 34, which in turn is coupled to an input end of the amplifier 33. The third path leads to an auxiliary (second) tuner 32, coupled to an output end of measuring means including an analogue measuring circuit 35 an a digital measuring circuit 36. In this manner, access to the RF cable 7 of the HFC network 100 (shown in FIG. 1) is provided to each of the two-way splitter/combiner 30, the main tuner 31 and the auxiliary tuner 32, by the tandem link of the three-way splitter/combiner 29, ESD protector 28, attenuator 27, second and third RF connectors 25 and 26, directional coupler 24, power tap 22, and finally the first RF connector 21.

At the time of installing the EOL module 201, the attenuator 27 sets the dynamic range of this module. The ESD protector 28 provides protection against electro-static discharge during installation and lightning strikes. The splitter/combiner 29 routes the downstream RF signal to the main tuner 31 and auxiliary tuner 32.

Once the EOL module 201 is installed and activated, the main tuner 31 is automatically tuned and synchronized to the particular DOCSIS downstream channel frequency used by the HFC network 100 (shown in FIG. 1) for control signals, in order to provide means for receiving measurement requests from the server 1 (shown in FIG. 1) for performing uninterrupted real-time testing of the HFC network performance by measuring certain physical layer parameters of any given DOCSIS downstream channel selected by the server.

Upon receiving any such measurement request from the server 1, the auxiliary tuner 32 is then tuned and synchronized to the given downstream channel for the purpose of performing measurements of the requested channel parameters. The auxiliary tuner 32 performs a downstream frequency scan for performing measurements of the downstream frequency response, as well as communicates with the analogue and digital measuring circuits 35 and 36 to perform any requested digital and analogue measurements. This way, the main tuner 31 is left free to constantly communicate over DOCSIS, to check for any measurement requests to be made by the server 1, while the rest of the EOL module 201 is performing measurements without interruption by the server 1.

The analogue measuring circuit 35 measures analogue parameters including analog signal levels, carrier level, carrier to noise ratio (CNR), and power line hum modulation. The digital measuring circuit 36 measures digital parameters including modulation error ratio (MER), bit error rate (BER), and digital signal level. The CM chip 34, includes a cable modem and an optional multi-media terminal adapter (MTA), which measures other parameters relevant to impairments in Voice over Internet Protocol (VoIP), including frequency of lost packets, jitter and voice quality. Furthermore, the upstream sweep 37 performs measurements of the upstream frequency response. The combination of the auxiliary tuner 32, the analogue measuring circuit 35, the digital measuring circuit 36, the upstream sweep 37, and the optional MTA within the CM chip 34 jointly act as measuring means for taking measurements of any one of the above parameters upon receiving measurement requests from the server 1 over the DOCSIS downstream channel via the main tuner 31.

The cable modem within the CM chip 34 then transmits results of the performed measurements to the server 1 (shown in FIG. 1) over the DOCSIS upstream channel through the amplifier 33, the two-way splitter/combiner 30, and onward through the CMTS transceiver 3 and IP network 2 (also shown in FIG. 1), in accordance with the DOCSIS protocol.

The server 1 normally has a suite of tests queued for the EOL monitor 200 to perform, upon receiving measurement requests for the server 1. To minimize the delay incurred by the typically long initialization time span in the DOCSIS protocol (up to several minutes), the EOL monitor 200 remains connected to the DOCSIS service, by dedicating the main tuner 31 to the DOCSIS protocol thereby making the test latency very short.

The server 1 then logs the received measurement results for performance history, and generates alarms based on thresholds set and stored therein. Optionally, the server 1 generates daily reports as to the performance of each monitored node to determine which node needs the most attention.

The server 1 is capable of requesting these measurements from the EOL monitor 200 both on a regularly scheduled basis, and alternatively on a demand basis. This gives the cable technician the ability to sit behind his/her desk and troubleshoot many geographically diverse points in a relatively short period of time. By recording performance over a period of time, it is possible to find intermittent problems that potentially plague the cable system.

Figure 3:
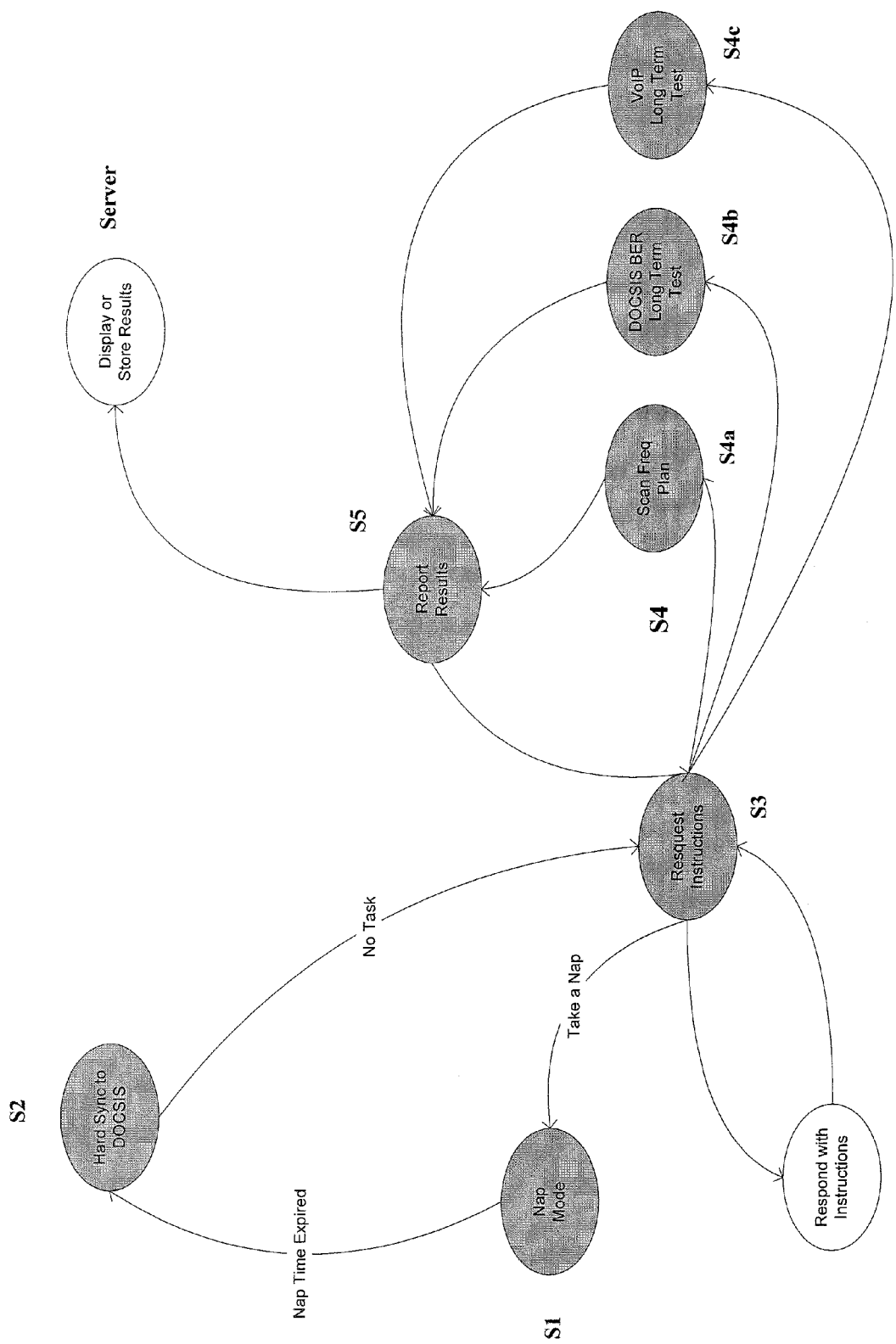
FIG. 3 illustrates in a flow chart, the operational states of the EOL monitor illustrated in FIG. 2.

FIG. 3 shows, in a flow chart, the operational states of an EOL system making use of the EOL monitor 200 shown in FIG. 2 in accordance with the embodiment illustrated in FIG. 2. The white states are for the monitoring server 1 shown in FIG. 1. The shaded states are for the EOL monitor 200.

The EOL monitor 200 starts in a first state S1, being a nap mode. After a timer expires, the monitor moves to a second state S2, by triggering the EOL monitor 200 to wake up and synchronize the main tuner 31 thereof to the DOCSIS channel, i.e. the CMTS downstream frequency. At this point the EOL monitor 200 has no task in its queue, so it will move to a third state S3 of asking the server 1 for tasks to be performed. If no tasks are requested by the server's response, the EOL monitor 200 will return to the first state S1 to be again in the nap mode.

If, however, the server's response includes at least one task to be performed then the EOL monitor 200 will move to a fourth state S4 of performing the requested tasks. Shown in FIG. 3 are three exemplary states each for performing a given tasks, i.e. S4a for a frequency scan, S4b for performing a long-term DOCSIS test, and S4c for performing a long-term VoIP quality test. In a fifth state S5, the EOL monitor 200 will report the results of these tests to the server 1, which in turn processes the results for display and/or storage. These results provide live data, monitoring functions and/or trigger alarms in the server 1.

Once the EOL monitor 200 has performed the requested tasks, it will revert to the third state S3 by asking the server 1 for more requested tasks. Depending on the response received, it will decide to go to one of the fourth state S4 of performing any newly requested tasks if any, and the first state S1 to take another nap if no tasks are requested by the server 1. This nap is the start of a new cycle.

The above-described embodiments are intended to be examples of the present invention. Numerous variations, modifications, and adaptations may be made to the particular embodiments by those of skill in the art, without departing from the spirit and scope of the invention, which are defined solely by the claims appended hereto.

I claim:

1. An end-of-line monitor for real time monitoring the performance of a hybrid network based on Data-Over-Cable Service Interface Specification (DOCSIS), in response to a measurement request received from a remote server, the monitor comprising:
    a connector for connecting the end-of-line monitor to an RF cable end of line in the hybrid network, and for receiving and transmitting DOCSIS channels via the hybrid network;
    a first tuner for receiving the measurement request, via a predetermined DOCSIS downstream control channel of the hybrid network, and for remaining in contact with the server to receive other measurement requests;
    a second tuner tunable to any other downstream channel for receiving signals transmitted on a selected one of the downstream channels in accordance with the measurement request;
    a measuring device, in communication with the first and the second tuners, for performing the requested measurement on a selected downstream channel; and
    a DOCSIS cable modem linked to the measuring device, for transmitting results of the requested measurement to the remote server, over a predetermined upstream DOCSIS channel of the hybrid network;
    wherein, in operation, the server collects and evaluates the measurement results for performing remote end-of-line diagnostics.

2. The monitor of claim 1, wherein the hybrid network is a Hybrid Fiber Coaxial network.

3. The monitor of claim 1, wherein each of the cable modem and the first tuner communicate with the server via an Internet Protocol.

4. The monitor of claim 1, wherein the measuring device comprises an analogue measuring circuit for performing the requested measurement of a parameter selected from the group consisting of analog signal levels, carrier level, carrier to noise ratio, and power line hum modulation.

5. The monitor of claim 1, wherein the measuring device comprises a digital measuring circuit for performing the requested measurement of a parameter selected from the group consisting of modulation error ratio, bit error rate, and digital signal level.

6. The monitor of claim 1, wherein the measuring device comprises a multi-media terminal adapter for performing the requested measurement of a parameter relevant to Voice over Internet Protocol, selected from the group consisting of frequency of lost packets, jitter and voice quality.

7. The monitor of claim 1, wherein the measuring device comprises an upstream sweep for performing the requested measurement of the upstream frequency response.

8. The monitor of claim 1, configured to receive a schedule from the remote server to perform an automatic measurement of a predefined set of channel parameters according to a preset schedule.

9. The monitor of claim 1, wherein the server is positioned at a head-end of the hybrid network.

10. The monitor of claim 1, further comprising a power supply fed by a trunk of the hybrid network for powering the monitor.

* * * * *